(12) United States Patent
Cohen et al.

(10) Patent No.: US 8,630,341 B2
(45) Date of Patent: Jan. 14, 2014

(54) METHOD FOR TRAINING AND UTILIZING SEPARABLE TRANSFORMS FOR VIDEO CODING

(75) Inventors: Robert A. Cohen, Somerville, MA (US); Osman G Sezer, Smyrna, GA (US); Anthony Vetro, Arlington, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 338 days.

(21) Appl. No.: 13/007,394

(22) Filed: Jan. 14, 2011

(65) Prior Publication Data

US 2012/0183043 A1 Jul. 19, 2012

(51) Int. Cl.
*H04N 7/26* (2006.01)

(52) U.S. Cl.
USPC ........... 375/240.03; 375/E7.027; 375/E7.226; 375/E7.243

(58) Field of Classification Search
CPC ....................................................... H04N 7/26
USPC ....................................................... 375/240
See application file for complete search history.

(56) References Cited

U.S. PATENT DOCUMENTS

| 7,995,850 B2 * | 8/2011 | Yu et al. .................. 382/250 |
| 2007/0016406 A1 * | 1/2007 | Thumpudi et al. ............ 704/205 |

FOREIGN PATENT DOCUMENTS

| WO | 2010087807 | 8/2010 | |
| WO | WO 2010087807 | * 8/2010 | ............... H04N 7/12 |

OTHER PUBLICATIONS

Osman G. Sezer et al. "A Soarsity-Distortion-Optimized Multiscale Representation of Geometry," Proceedings of 2010 IEEE 17th International Conference on Image Processing.
Joel Sole et al. "Joint Sparsity-Based Optimization of a set of Orthonormal 2-D Separable Block Transforms," IEEE International Conference on Image Processing; Nov. 7, 2009, pp. 9-12.

* cited by examiner

*Primary Examiner* — Mehrdad Dastouri
*Assistant Examiner* — Nguyen Truong
(74) *Attorney, Agent, or Firm* — Dirk Brinkman; Gene Vinokur (57) ABSTRACT

A video encoded as a bit stream is decoded using trained sparse orthonormal transforms generated from decoded prediction residual signals, wherein the transforms have associated indices. A current macroblock is entropy decoded and inverse quantized to produce decoded coefficients. For the current macroblock, an $L_0$-norm regularized training process generates a set of mode-dependent sparse orthonormal inverse transforms, selected according to a prediction mode signaled in the bit stream. Decoded coefficients are inverse transformed and then are combined with previously decoded macroblocks to generate an output macroblock of a reconstructed video.

18 Claims, 6 Drawing Sheets

METHOD FOR TRAINING AND UTILIZING SEPARABLE TRANSFORMS FOR VIDEO CODING

FIELD OF THE INVENTION

This invention relates generally to video encoding and decoding, and more particularly to a method for training and utilizing transforms for video coding.

BACKGROUND OF THE INVENTION

In video coding, frames are typically encoded in two ways:
i) intra coding, and
ii) inter coding.

In intra coding, the spatial correlation of blocks within a frame is utilized to generate prediction residuals, which have significantly less energy than the corresponding original image blocks. The prediction residual is the difference between an original block and its prediction. Hence, fewer bits are required to encode the blocks at a given level of fidelity.

For inter coding, motion-compensated prediction residuals are generated using blocks within a temporally adjacent frames.

Figure 1:
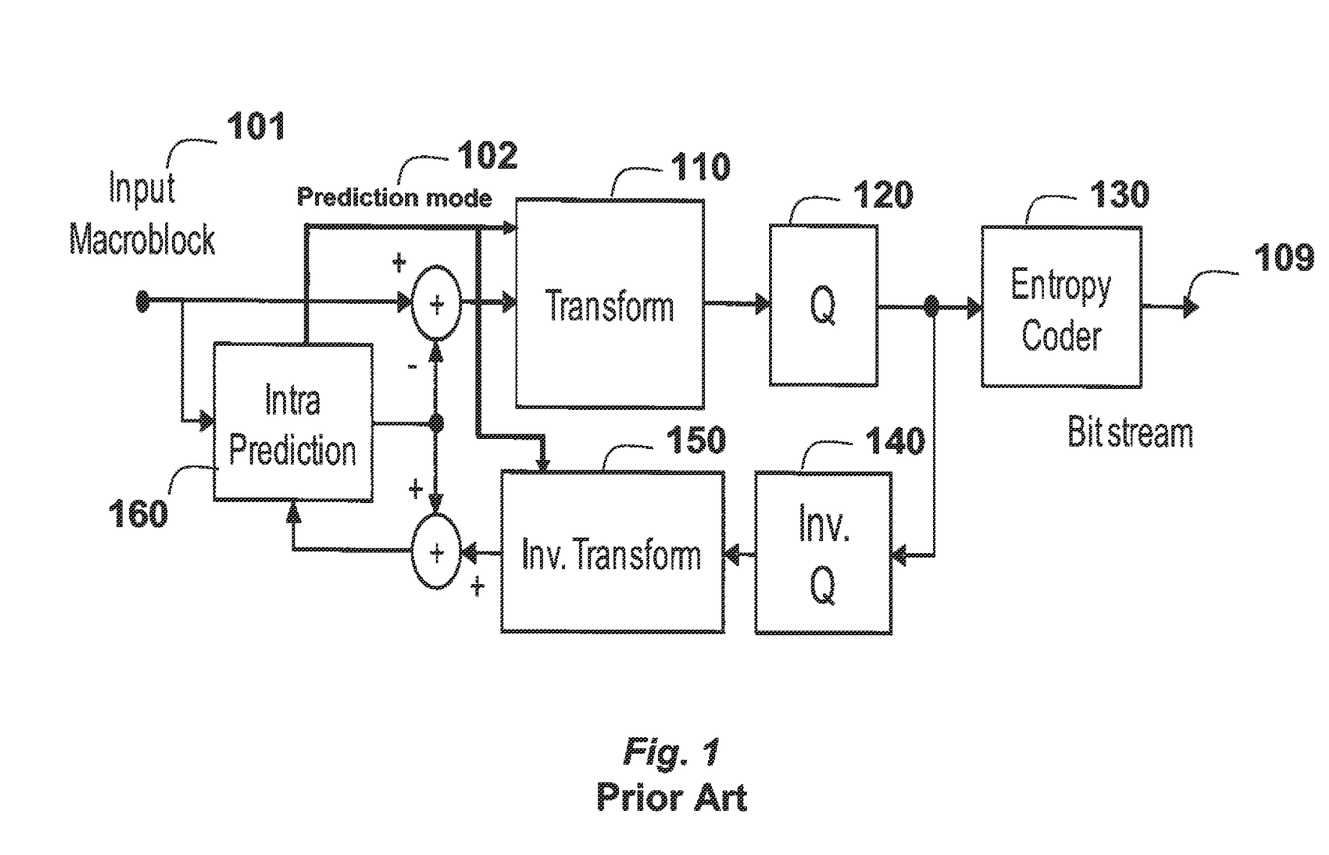
FIG. 1 is a block diagram of a prior art encoder.

FIG. 1 shows a conventional encoder. Input is a macro block 101 and output is a bit stream 109. The macroblock is transformed 110 by a transform that is selected based upon the prediction mode 102. The transformed data is then quantized 120 to a quantized signal. The quantized signal is entropy coded 130 to produce the bit stream 109. Output of the entropy coder is also inverse quantized 140, inversed transformed 150 and used for intra prediction 160 when combined with the input macroblock 101.

Figure 2:
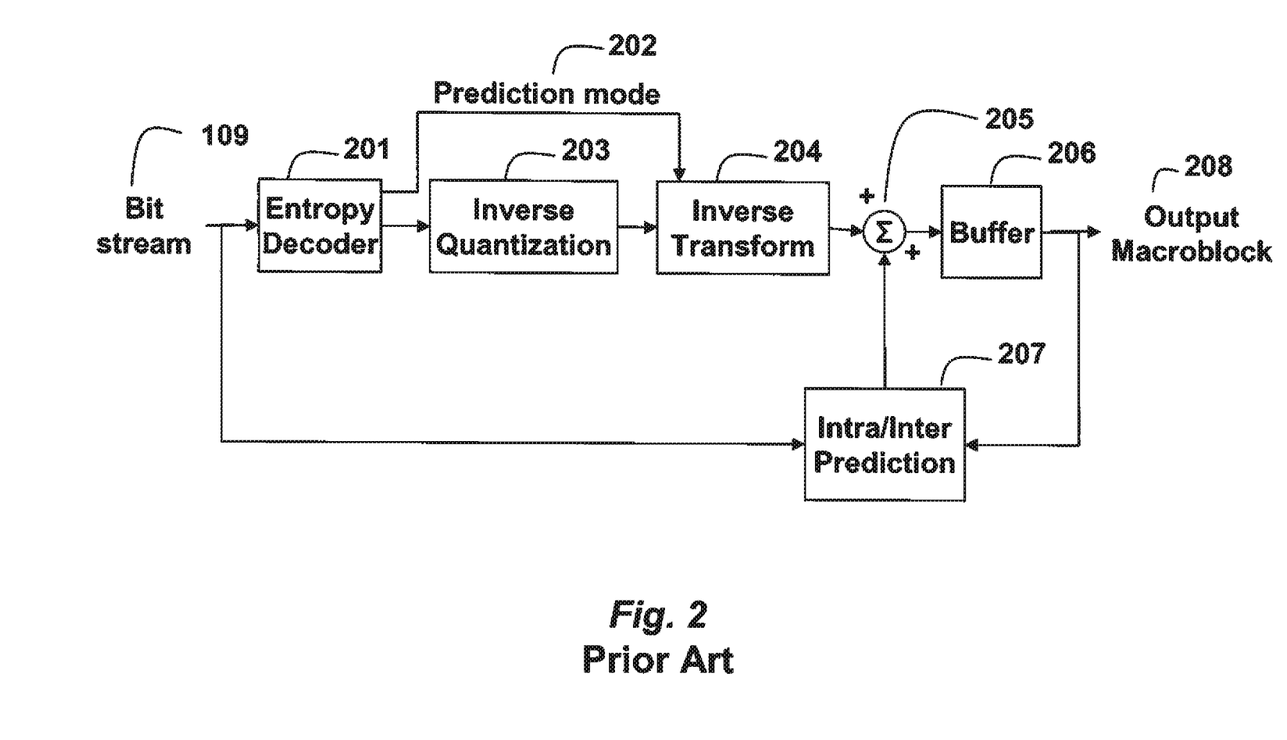
FIG. 2 is a block diagram of a prior art decoder.

FIG. 2 shows a conventional decoder. The input is a bit stream 109 and the output is a macroblock 208. The bit stream is entropy decoded 201, and inverse quantized 203. The decoded transform coefficients are inverse transformed 204, where the transform is selected based upon the prediction mode 202. An intra or inter prediction residual 207 is combined 205 to produce a decoded macroblock. This macroblock is output and stored in a buffer 206 to be used for reconstruction future decoded macroblocks.

In state-of-the-art video encoders/decoders (codecs), such as codecs designed according to the H.264/AVC standard, the prediction for an intra coded block is determined from previously coded spatially neighboring blocks in the same frame. Several directional predictions are generated, and a fitness measure such as sum of absolute differences (SAD), sum of squared error (SSE), or sum of absolute transformed differences (SATD) is determined for each direction. In H.264/AVC, the best prediction direction or "mode" is selected, and the corresponding prediction residual is transformed via the conventional integer Discrete Cosine Transform (DCT) prior to quantization. Because the residuals of the same mode possess common patterns of correlation, one can design transforms that further exploit these patterns to reduce the bit rate. The prior art defines a set of transforms called Mode Dependent Directional Transforms (MDDT). MDDT utilizes the Karhunen-Loève Transform (KLT) as a trained set of transforms for residuals of each intra prediction mode.

The KLT, however, is vulnerable to outliers in the training data. The outliers can skew the KLT in such a way that they become suboptimal when used to subsequently transform and code video data after the training process. Additionally, the KLTs may not be a sparse as desired for practical video coding situations. Hence, there is a need for a method to train and utilize transforms in a manner that is still accurate in to the presence of outliers.

SUMMARY OF THE INVENTION

The embodiments of the invention provide methods for training sparse orthonormal transforms and utilizing the transforms to encode and decode a video. An $L_0$-norm regularized training process is described to generate a set of mode-dependent sparse orthonormal transforms.

These transforms and corresponding inverse transforms are used as part of the video encoding and decoding processes. In another embodiment, the training process is used by the decoder and by the decoder which is embedded in the encoding system, so that the transforms do not need to be trained prior to encoding.

DETAILED DESCRIPTION OF THE PREFERRED EMBODIMENT

Figure 3:
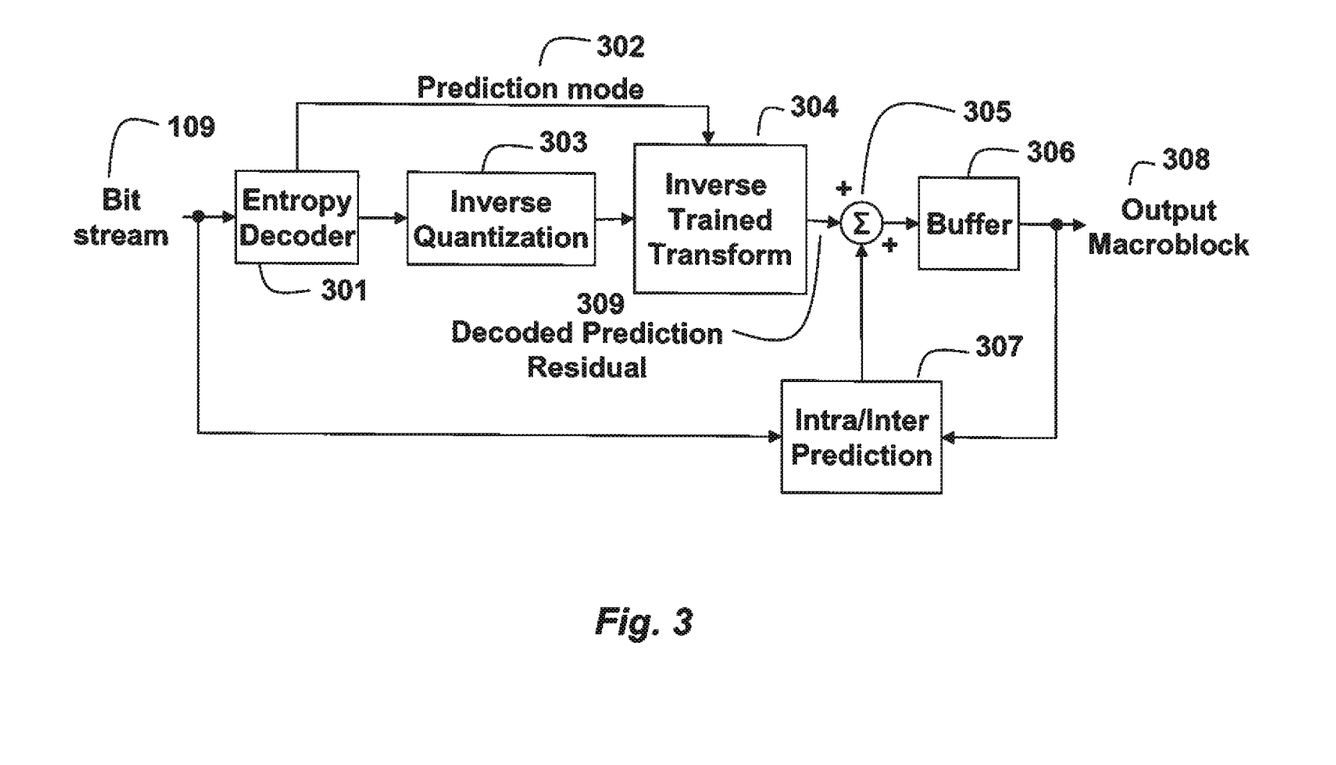
FIG. 3 is a block diagram of a decoder that uses mode dependent sparse orthonormal transforms.

As shown in FIG. 3, the video decoding process in this invention performs an entropy decoding 301 on the bitstream 109 followed by an inverse quantization 303 and inverse trained transform 304. The inverse trained transform 304 is based on the prediction mode 302 and outputs a decoded prediction residual 309. The decoded prediction residual 309 is added to the prediction from the intra/inter prediction 307 to produce an output macroblock 308, which is also stored in the buffer 306.

The inverse trained transform 304 differs from the inverse transform 150 in the prior art in that the transform 304 is trained using the decoded prediction residual 309, rather using a fixed function, such as the well-known discrete cosine transform (DCT).

Furthermore, the inverse trained transform according to this invention differs from the prior art MDDT solution, which is based on KLT, in that the training process that determines the inverse trained transform 304 accounts not only for a reconstruction error, but also for the number of nonzero transform coefficients, which makes the transform coefficients sparse. In numerical analysis, sparsity refers to the extent to which a measure contains null or zero values.

In one embodiment of the invention, the inverse trained transforms are trained using the decoded prediction residuals before the encoding of the video. Such training is typically done offline using a separate set of training videos. Both the encoder and the decoder maintain identical sets of inverse trained transforms, which are typically fixed for the coding of the video sequence.

In another embodiment of the invention, the inverse trained transforms are trained using decoded prediction residuals during the encoding and decoding of a current video sequence. With this embodiment, the data used for training includes the decoded prediction residuals associated with previously decoded samples of the current video which are available at both the encoder and decoder. Both the encoder and the decoder maintain the same set of inverse trained transforms, but the inverse trained transforms are dynamic and updated on a periodic basis during the encoding and decoding processes of the video sequence.

In the following, the training process to determine the inverse trained transforms according to our invention is described, as well as the method to determine transform coefficients from residual data based on the trained transforms.

Training Mode Dependent Sparse Orthonormal Transforms

Figure 4:
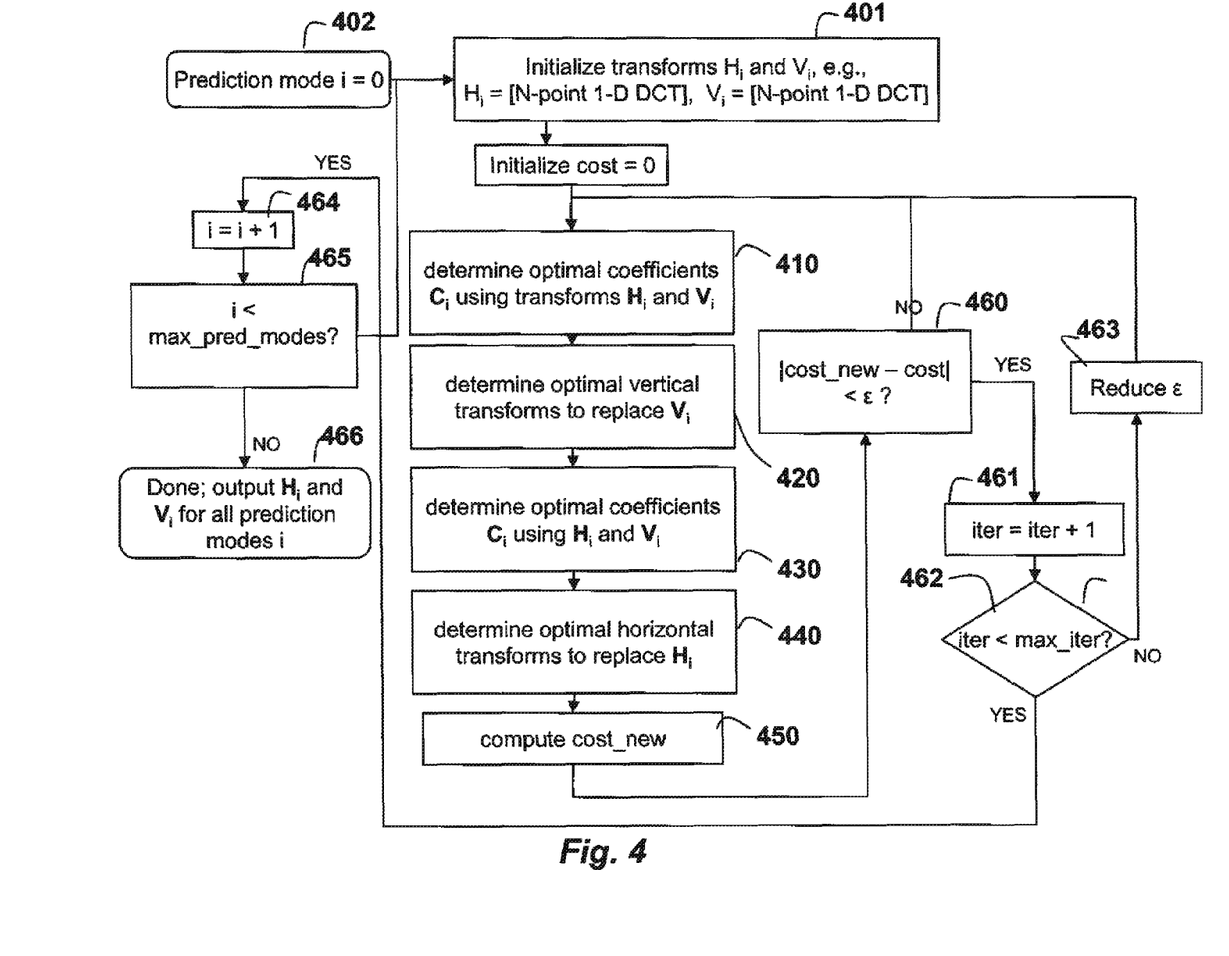
FIG. 4 is a flowchart of a method for training a mode dependent sparse orthonormal transform.

FIG. 4 shows a method for training a mode dependent sparse orthonormal transforms according to this invention for blocks of size N×N. During an initialization step 401, the prediction mode i is initialized 402 to zero, and horizontal and vertical transforms $H_i$ and $V_i$ for prediction mode i are initialized. One example of how $H_i$ and $V_i$ can be initialized is setting them to be equivalent to the N-point one-dimensional DCT. The iteration counter 'iter,' and cost metric 'cost' for the training process are initialized to zero.

Next, an optimal set of coefficients $C_i^j$ are determined 410 given an input set of prediction residuals $X_i^j$ and the above described horizontal and vertical transforms $H_i$ and $V_i$. This coefficient process is described below.

Given the set of coefficients $C_i^j$ and prediction residuals $X^j$, new values for the vertical transform $V_i$ are determined 420 by solving $$V_i^* = \underset{A}{\operatorname{argmin}}\left\{ \sum_{X_i^j \in S_i} \|X_i^j - AC_i^{j*}H_i^T\|_2^2 \right\}$$

such that $A^T A = I$, where I is the N×N identity matrix. This is accomplished by summing the product of the prediction residuals for the current prediction mode, $X_i^j$, the transpose of the current horizontal transforms $H_i$, and the previously determined coefficients $C_i^j$ as follows:

$$Y = \Sigma_{X_i^j \in S_i} X_i^{j^T} H_i^T C_i^j.$$

Singular-value decomposition is then applied on Y, such that $Y = USW^T$. The new vertical transforms $V_i^*$ are then determined in step 420 as $$V^*_i = WU^T$$

The vertical transforms $V_i$ are then replaced by $V_i^*$.

Now that new vertical transforms have been determined, the coefficient computation process is repeated 430 to determine an optimal set of coefficients $C_i^j$ given the input set of prediction residuals $X_i^j$ and the current horizontal and vertical transforms $H_i$ and $V_i$.

Given the set of coefficients C and prediction residuals $X^j$, new values for the horizontal transform $H_i$ are determined 440 by solving $$H_i^* = \underset{A}{\operatorname{argmin}}\left\{ \sum_{X_i^j \in S_i} \|X_i^j - V_i^* C_i^{j*} A^T\|_2^2 \right\}$$

such that $A^T A = I$, where I is the N×N identity matrix. This is accomplished by summing the product of the prediction residuals for the current prediction mode, the transpose of the current vertical transforms $V_i$, and the previously determined coefficients $C_i^j$ as follows:

$$Y = \Sigma_{X_i^j \in S_i} C_i^{j^T} V_i^T X_i^j.$$

The singular-value decomposition is then applied on Y, such that $Y = USW^T$.

The new vertical transforms $H_i^*$ are then determined:

$$H^*_i = WU^T$$

The vertical transforms $H_i$ are then replaced by $H_i^*$ in step 440.

Now that a new set of horizontal and vertical transforms have been determined, a cost value cost_new is computed 450. To determine the cost value, the coefficient computation process is performed using the current transform $H_i$ and $V_i$. The new set of optimal coefficients $C_i^j$ are then used to determine a cost metric, which incorporates the distortion (or error incurred by using these transforms), to reconstruct the training data, along with the sparsity of the coefficient data $$\text{cost\_new} = \left( \sum_{j \in S_i} \min_{C_i^j} \|X_i^j - V_i C_i^j H_i^T\|_2^2 + \lambda \|C_i^j\|_0 \right).$$

To obtain an optimal solution for this cost metric, the product $V_i X_i^j H_i^T$ is set to zero when $|V_i X_i^j H_i^T| < \sqrt{\lambda}$. The value $\lambda$ is a weighting scalar value. When $\lambda$ is close to zero, the cost metric prioritizes the minimization of distortion. As $\lambda$, is increased, priority is given to the sparsity, or $L_0$ norm, of the transform coefficients. Typically, the value for $\lambda$ is experimentally determined so that low coding distortion can be achieved using transforms that produce relatively few non-zero coefficients. The value for $\lambda$ may also be adjusted for each iteration iter of this process.

If (460) |cost_new−cost| is less than a predetermined threshold c, this process of computing optimal coefficients and horizontal/vertical transforms is repeated. Steps 461 and 462 increment the iteration counter, and check for a termination condition, respectively If |cost_new−cost| is below the given threshold $\epsilon$, and if a maximum number of iterations has not been reached, this process of computing optimal coefficients and horizontal/vertical transforms is repeated with a smaller value of $\epsilon$ 463.

If |cost_new−cost| is below the given threshold $\epsilon$, and if a maximum number of iterations have been reached, then the computation of $H_i$ and $V_i$ for this prediction mode i is complete.

The prediction mode i is incremented 464, and if there are additional prediction modes to be processed 465, training for the transforms for the subsequent prediction mode begins 401. This transform training process is repeated for each desired prediction mode i. If processing of all prediction modes is complete, the process ends 466, and output $H_i$ and $V_i$ for all prediction modes i.

The inverse transforms $H^{-1}_i$ and $V^{-1}_i$ are the inverses of the corresponding forward transforms $H_i$ and $V_i$. Because $H_i$ and $V_i$ are orthonormal, the inverse is equivalent to the transpose. Thus, the inverse horizontal and vertical transforms can be determined as $H^T_i$ and $V^T_i$.

This process can also be performed so that the horizontal transforms $H_i$ are determined before the vertical transforms $V_i$.

Computing Optimal Transform Coefficients

Figure 5:
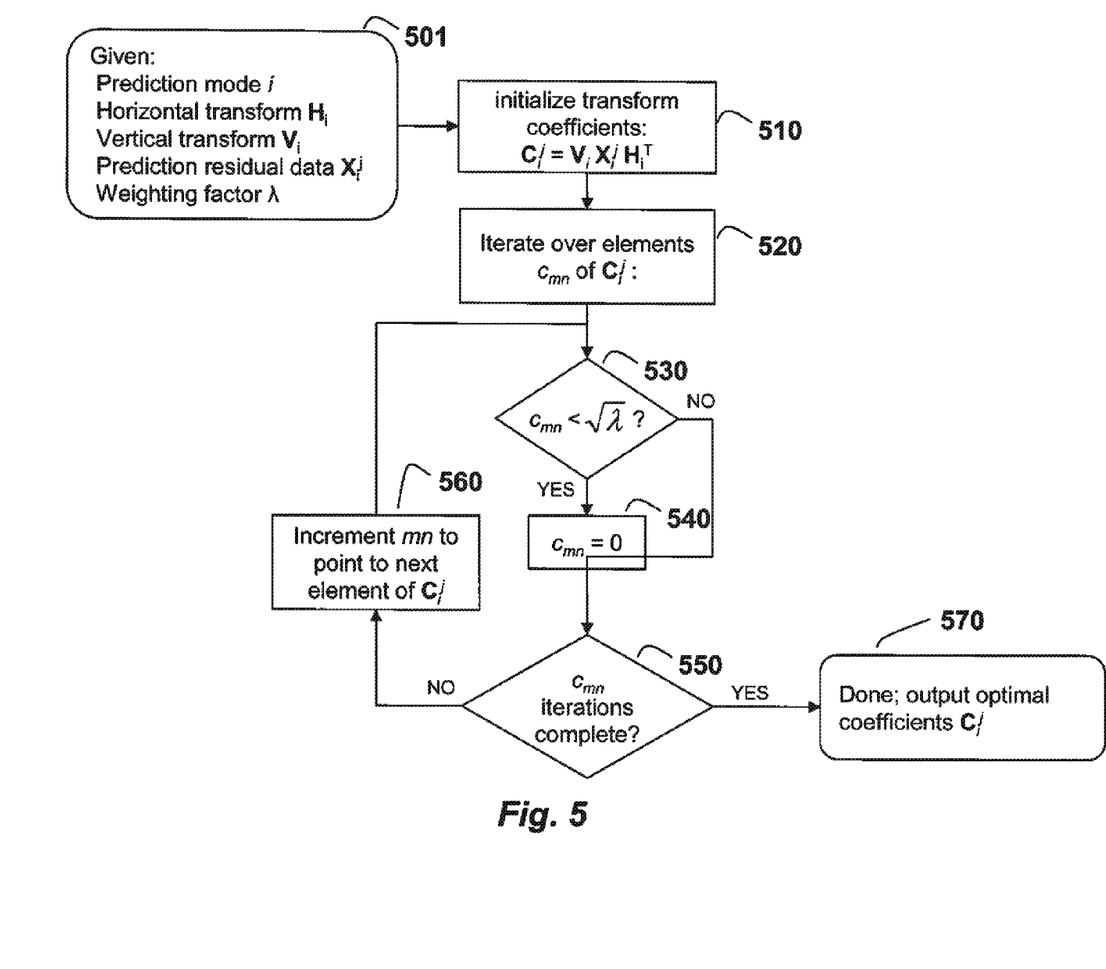
FIG. 5 is a flowchart of a method for computing the optimal transform coefficients.

FIG. 5 shows the optimal coefficient computation process. The purpose of this process is, given 501 the horizontal and vertical transforms $H_i$ and $V_i$ and a set of prediction residuals $X_i^j$, and a weighting factor $\lambda$, determine a new set of transform coefficients $C_i^{j*}$ that minimizes the cost metric incorporating the reconstruction distortion and coefficient sparsity:

$$C_i^{j*} = \underset{D}{\operatorname{argmin}}(\|X_i^j - V_i D_i^j H_i^T\|_2^2 + \lambda \|D_i^j\|_0)$$

where $$D = V_i^T X_i^j H_i$$

and D is equivalent to $C_i^j$. To determine this new set of transform coefficients, the set of coefficients is initialized 510 as $C_i^j = V_i X_i^j H_i^T$.

We iterate 520 over all elements $C_{mn}$ of $C_i^j$.

We check 530 if $C_{mn} < \sqrt{\lambda}$.

Because $H_i$ and $V_i$ are orthonormal, the optimal coefficients are obtained when D, i.e. $C_i^j$, is thresholded so values below $\sqrt{\lambda}$ are set 540 to zero. Step 550 checks if the iterations are complete, and if no, mn is incremented 560 to point to the next element of $C_i^j$. Otherwise, terminate 570, and output the optimal coefficients $C_i^j$.

Decoder with Online Training of Transforms

Figure 6:
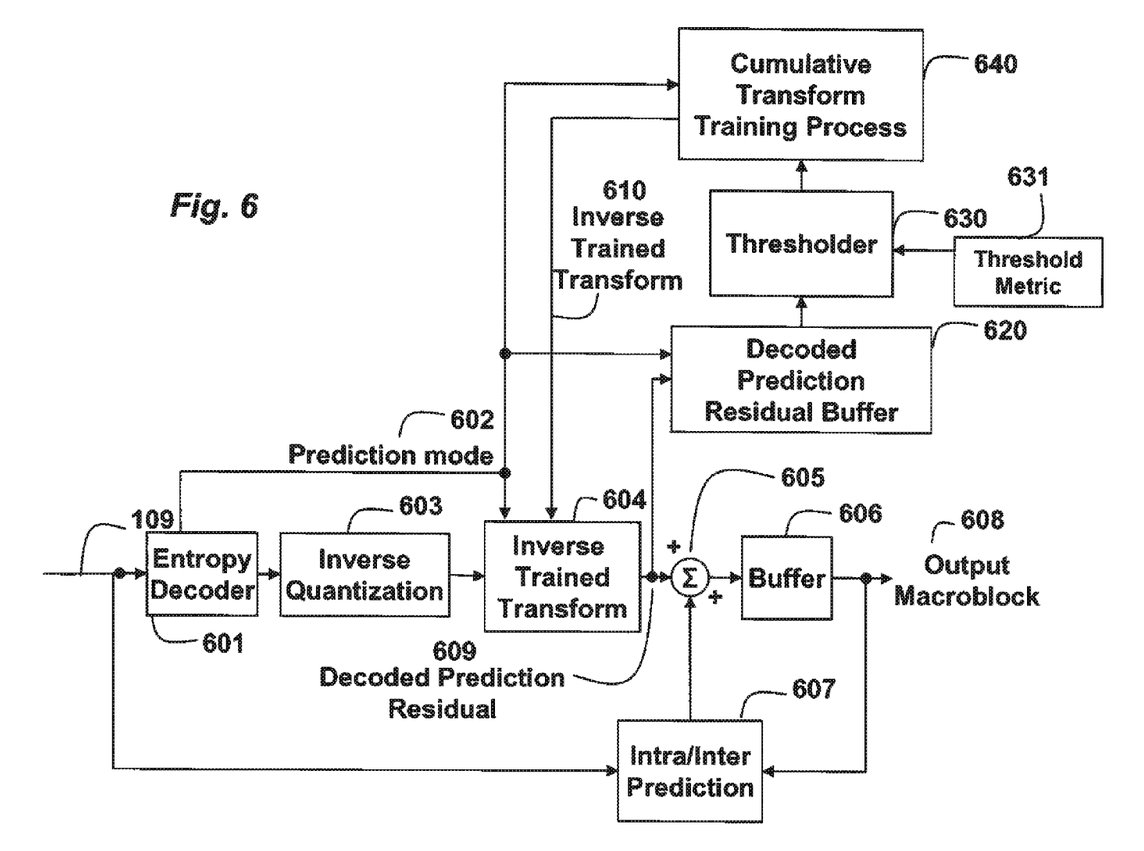
FIG. 6 is a block diagram of a decoder that uses mode dependent sparse orthonormal transforms that are trained from previously decoded data.

FIG. 6 shows an embodiment of a decoder using mode dependent sparse orthonormal transforms trained using previously decoded data. The input is a bit stream 109 and the output is a macroblock 608. The bit stream is entropy decoded 601, and inverse quantized 603. The decoded transform coefficients are inverse transformed using an inverse trained transform 604, where the transform is selected based upon the prediction mode 602. The decoded prediction residual 609 is combined 605 with the intra/inter prediction 607 to generate a decoded macroblock. This macroblock is output and stored in a buffer 606 to be used for reconstruction future decoded macroblocks.

The inverse trained transform is initially set to a conventional transform such as the inverse DCT. Other embodiments can initialize this transform to other inverse transforms such as mode dependent sparse orthonormal transforms that were designed prior to decoding using the process of FIG. 4.

Decoded prediction residuals 609 are input to the decoded prediction residual buffer 620. This buffer accumulates the decoded prediction residuals and their corresponding prediction modes.

The thresholder 630 measures the amount of data contained in the decoded prediction residual buffer 620. When enough data has been collected for a given prediction mode, the prediction residuals for that mode are input to the cumulative transform training process 640. The decision on when enough data has been collected is determined by the thresholder metric 631. Some examples of thresholder metrics are: The number of prediction residuals that have been collected for a given prediction mode; the number of nonzero coefficients or energy contained in the prediction residuals prior to the inverse transform; the quantization parameter or other quantization coarseness metrics for the collected decoded blocks; other modes or values collected from the bit stream.

When the thresholder 630 signals to the cumulative transform training process 640 that training can begin, the training process determines a new set of horizontal and vertical transforms to be used for the inverse trained transform 604. This new transform is used on subsequently decoded blocks that have the same corresponding prediction mode 602.

As each new block is decoded from the bit stream, the training process and transform update continues, using this new decoded data along with previously decoded data.

The cumulative transform training process 640 differs from the training process of FIG. 4 in that the summations and matrices determined during the training process are saved. Hence, decoded macroblocks are incrementally incorporated into the training, rather than re-computing all summations from all the stored data.

In other embodiments, the decoded prediction residual buffer 620 need not store all decoded prediction residuals. It can delete data that are considered to be obsolete. For example, if a scene-change is detected in the video, the thresholder or decoded prediction residual buffer can decide to flush old data that was received prior to the scene change.

In other embodiments, sets of trained transforms can be stored and used. For example, the training process can store a set of trained transforms for all prediction modes for a given class of video. When the class of received video changes, a different set of transforms can be used. Some examples of classes of video are videos of different sizes, graphics or animation videos, and natural scene videos.

Encoder with Online Training of Transforms

When the decoder of FIG. 6 is used, the encoder also uses transforms trained using previously-decoded data to avoid mismatch between the encoder and decoder. Here, the decoded prediction residual buffer 620, thresholder 630, and cumulative transform training process 640 are incorporated into the encoder so that both the transforms and inverse transforms are trained using the same decoded prediction residuals that will be received by the decoder.

Effect of the Invention

The invention provides a transform training process and video decoding and encoding techniques based upon these transforms. A set of mode dependent sparse orthonormal transforms are trained based upon prediction residual data obtained either prior to encoding or after decoding. The encoder and decoder can either use pre-trained transforms, or they can iteratively update and train these transforms based upon decoded data.

Although the invention has been described by way of examples of preferred embodiments, it is to be understood that various other adaptations and modifications can be made within the spirit and scope of the invention. Therefore, it is the object of the appended claims to cover all such variations and modifications as come within the true spirit and scope of the invention.

We claim:

1. A method for decoding a video encoded as a bit stream in a video decoder, comprising the steps of:
    maintaining a set of inverse trained transforms generated from decoded prediction residuals of the video, and wherein the inverse trained transforms account for a reconstruction error and a number of nonzero transform coefficients, and wherein a method for training the inverse trained transforms comprises:
        determining optimal coefficients using horizontal transforms and vertical transforms; and
        updating the vertical transforms using the horizontal transforms and the optimal coefficients to produce new vertical transforms;
        updating the optimal coefficients using the horizontal transforms and the new vertical transforms to produce new optimal coefficients; and
        updating the horizontal transforms using the new optimal coefficients and the new vertical transforms;
    entropy decoding and inverse quantizing a current macroblock of the bit stream to produce decoded coefficients;

selecting, for the current macroblock, a particular inverse trained transform of the set of inverse trained transforms according to a prediction mode signaled in the bit stream;

applying the particular inverse trained transform to the decoded coefficients to reconstruct a current decoded macroblock prediction residual; and combining the current decoded macroblock prediction residual with previously decoded macroblocks to generate an output macroblock of a reconstructed video, wherein the steps are performed in a decoder.

2. The method of claim 1, wherein the maintaining is based on decoded prediction residuals obtained from previously decoded macroblocks of the video.

3. The method of claim 1, wherein the maintaining is based on decoded prediction residuals obtained from decoded macroblocks of a set of training videos.

4. The method of claim 1, further comprising:
maintaining the set of inverse trained transforms in an encoder to encode the video.

5. The method of claim 1, wherein the inverse trained transforms are trained using the decoded prediction residuals before encoding of the video in an encoder.

6. The method of claim 4, wherein the encoder and the decoder maintain identical sets the of inverse trained transforms.

7. The method of claim 4, wherein the inverse trained transforms are trained using decoded prediction residuals encoding and the decoding of the video.

8. The method of claim 7, wherein the sets of inverse trained transforms are dynainic and updated on a periodic basis during the encoding and the decoding.

9. The method of claim 1, further comprising:
computing a cost value using a cost metric and the vertical transforms and the horizontal transforms, which incorporates an error by using these vertical transforms and the horizontal transforms; and repeating iteratively the determining and computing steps until the cost value is less than a predetermined threshold.

10. The method of claim 1, wherein the video is an input but stream to the decoder, and the decoder further performs the steps of:
entropy decoding and inverse quantizing the bit stream to obtain transform coefficients;
applying the a set of inverse trained transforms to the transform coefficients based on a prediction mode;
combining the decoded prediction residual with intra and inter prediction to generate an output macroblock.

11. The method of claim 9, wherein the training is cumulative and decoded macroblocks are incrementally incorporated into the training.

12. The method of claim 9, wherein the vertical and horizontal transforms and the set of inverse transforms are associated with classes of videos, and the vertical and horizontal transforms and the set of inverse transforms for a particular class are trained using the decoded prediction residuals corresponding to the particular class.

13. The method of claim 9, wherein the cost metric is adaptive for each iteration.

14. The method of claim 9, wherein a different cost metric is used for each iteration.

15. The method of claim 9, wherein the cost metric is a function of the quantizing.

16. The method of claim 15, further comprising:
adjusting the cost metric based on a value of a distortion between an untransformed input block and inverse-transformed coefficients.

17. A method for decoding a video, comprising steps of:
determining iteratively an inverse trained transform for each prediction mode of the decoding, wherein each iteration includes determining optimal coefficients using horizontal transforms and vertical transforms; and updating the vertical transforms using the horizontal transforms and the optimal coefficients to produce new vertical transforms;

updating the optimal coefficients using the horizontal transforms and the new vertical transforms to produce new optimal coefficients; and updating the horizontal transforms using the new optimal coefficients and the new vertical transforms; and decoding the bit stream using the inverse trained transform, wherein the steps are performed in a processor.

18. A decoder for decoding a video, comprising at least one processor for:
maintaining a set of inverse trained transforms trained iteratively using optimal coefficients, wherein, during the training, determining optimal coefficients using horizontal transforms and vertical transforms; and updating the vertical transforms using the horizontal transforms and the optimal coefficients to produce new vertical transforms; updating the optimal coefficients using the horizontal transforms and the new vertical transforms to produce new optimal coefficients; and updating the horizontal transforms using the new optimal coefficients and the new vertical transforms, for each prediction mode and for each iteration of the training, the vertical transforms and the horizontal transforms are determined using different optimal coefficients; and decoding the bit stream using the set of inverse trained transform.

* * * * *